United States Patent [19]
Louis et al.

[11] 3,714,846
[45] Feb. 6, 1973

[54] HYDROSTATIC-DIFFERENTIAL TRANSMISSION
[75] Inventors: Joseph E. Louis, Rockford; George A. Schauer, Belvidere, both of Ill.
[73] Assignee: Sundstrand Corporation
[22] Filed: Feb. 23, 1971
[21] Appl. No.: 117,948

[52] U.S. Cl. ......................................74/687, 74/733
[51] Int. Cl. ..........................F16h 47/04, F16h 47/00
[58] Field of Search......................74/687, 720.5, 733

[56] References Cited

UNITED STATES PATENTS

| | | | |
|---|---|---|---|
| 2,599,814 | 6/1952 | Cull | 74/687 |
| 3,122,025 | 2/1964 | Mark et al. | 74/687 X |
| 3,135,234 | 6/1964 | Turnidge | 74/878 X |
| 3,293,943 | 12/1966 | MacDonald | 74/687 |
| 3,369,419 | 2/1968 | Henstrom et al. | 74/720.5 |
| 3,396,607 | 8/1968 | Ross | 74/687 |
| 3,444,765 | 5/1969 | Deschamps | 74/876 |
| 3,470,771 | 10/1969 | Houk | 74/876 |

Primary Examiner—Arthur T. McKeon
Attorney—Hofgren, Wegner, Allen, Stellman & McCord

[57] ABSTRACT

A hydromechanical transmission having plural power paths, one being a mechanical path and the other being a hydraulic path with an output differential for combining the torque of the two paths and providing an output for the transmission, there being provided a low speed plural path mode effected by clutching one of the differential elements to the input shaft, and a high speed straight hydraulic mode effected by locking the differential elements together for rotation as a unit. Both the low and high speed modes have forward and reverse speeds. A transmission ratio and mode control is provided that compensates for the difference in hydraulic displacement in the two modes so that the transmission may be easily shifted from zero output in the low speed mode to zero output in the high speed mode and vice versa.

25 Claims, 5 Drawing Figures

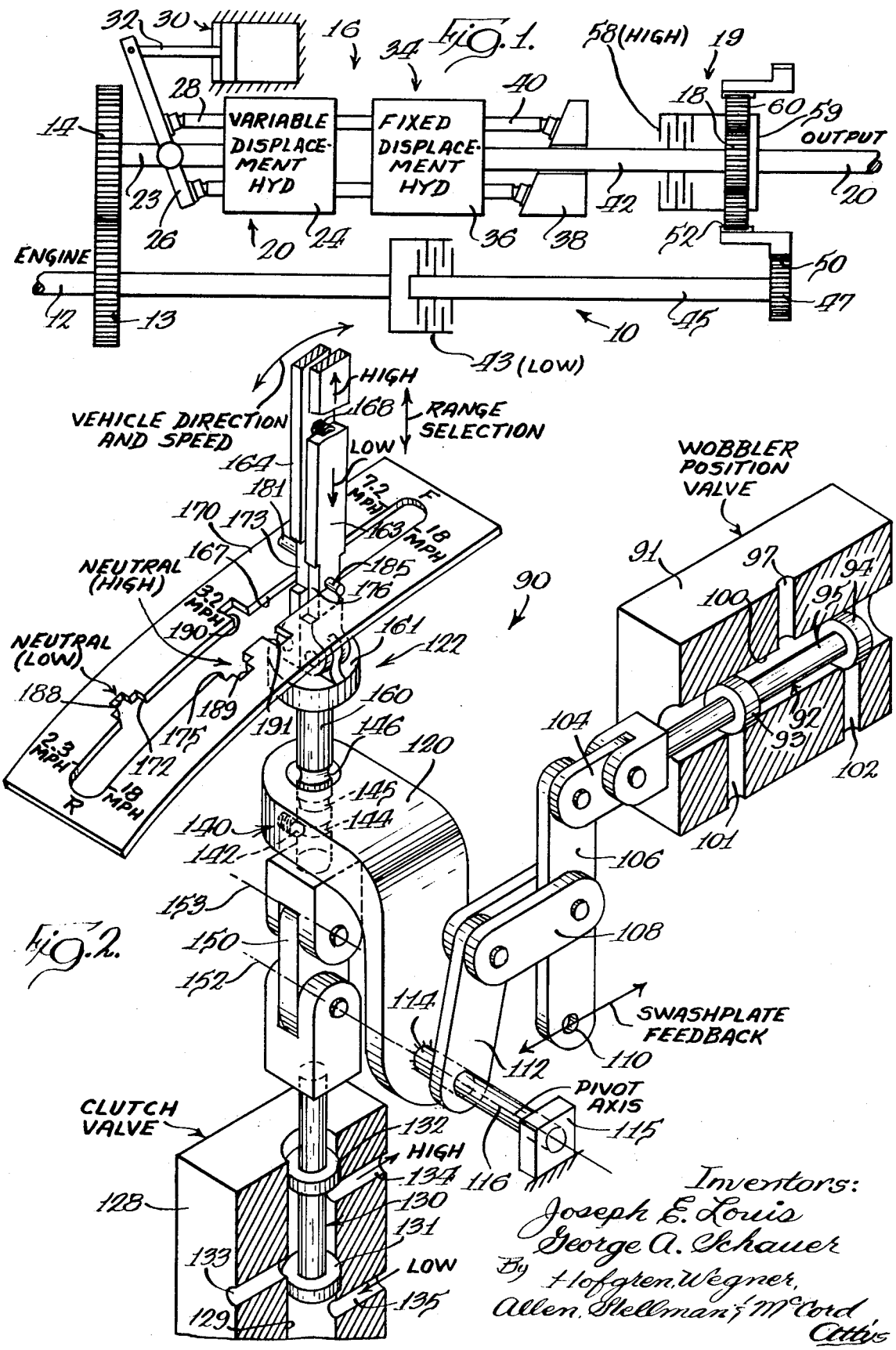

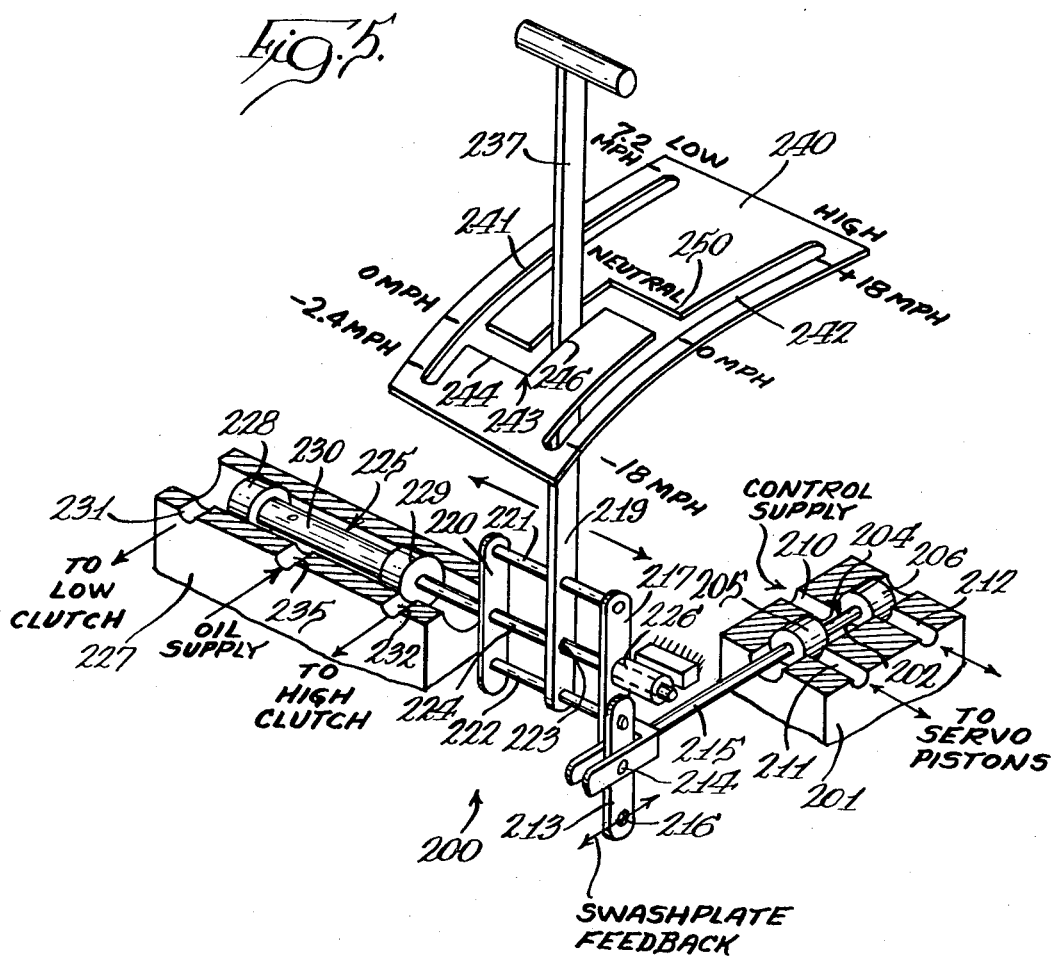

HYDROSTATIC-DIFFERENTIAL TRANSMISSION

BACKGROUND OF THE PRESENT INVENTION

In the past, hydrostatic transmissions have been provided for off-the-road vehicles, such as farm tractors. These transmissions have been found to be very advantageous primarily because they provide an infinitely variable transmission ratio in both forward and reverse. Moreover, such transmissions reduce the requirements for gearing and/or clutches in the transmission over conventional multi-speed ratio mechanical transmissions.

It is also well known to provide hydromechanical transmissions employing split power paths, one being a mechanical power path and the other being a variable displacement or variable ratio hydraulic power path. A differential is provided, often what is termed an output differential, for combining the torques of both mechanical and hydraulic power paths into a single output shaft torque. Such a split path hydromechanical transmission has the advantage of increasing the total efficiency of the transmission and reducing the size of the hydraulic unit by reducing the amount of torque that is transmitted through the hydraulic path since it has been found more efficient to transmit torque mechanically than through a purely hydrostatic drive or transmission.

The present invention has for its objective the provision of a transmission for an off-the-road vehicle, such as a farm tractor. The provision of a hydromechanical transmission for such an application has not heretofore been suggested since the wide speed range required of such a transmission for on-the-road operation, renders the transmission unsuitable for normal working use. That is, the wide speed range renders the torque availability in the low speed normal operating range of the vehicle insufficient for an off-the-road vehicle application.

It is the primary object of the present invention to obviate these deficiencies in off-the-road vehicular transmissions.

SUMMARY OF THE PRESENT INVENTION

According to the present invention a hydromechanical transmission is provided for a farm tractor, or other off-the-road vehicles, that has a low range split path mode in combination with a high range straight hydraulic mode. The low speed range mode is operable during normal working of the tractor, while the high speed range mode is operable while moving the vehicle from one working point to another at higher speeds.

Thus, the present invention is a transmission that has a wide range of forward and reverse speeds in both the low speed, high torque range as well as the high speed, low torque range.

It is well known that vehicles such as farm tractors, and other off-the-road vehicles require high operating torques at relatively low speeds throughout most of their use. It is, however, also desirable that the vehicle be capable of being driven at high speeds from one point to another.

Therefore, according to the present invention a low and high speed range transmission is provided where the low speed range is effected by placing the hydromechanical transmission in a split power path mode with part of the power being transmitted mechanically and the remaining power being transmitted hydraulically. Hydromechanical split transmissions are known to increase the overall efficiency of the transmission by reducing the amount of power that is delivered through the transmission in the hydraulic or hydrostatic path. The present invention takes advantage of this characteristic by utilizing the split power path in the low speed range so that efficient utility of the transmission is employed during periods of greater use and greater torque requirements. As a result, the size of the hydraulic units may be kept to a minimum, so as to reduce weight and expense.

The upper speed range of the present transmission is effected by eliminating the mechanical path and transmitting all of the power hydraulically through the hydraulic or hydrostatic power path of the transmission. In this manner, the hydrostatic power delivery is employed in the high speed range which requires less tractive effort during highway operation of the tractor compared to low speed off-the-road operation. Thus, in moving the vehicle from working point to working point, the straight hydraulic speed range provides effective low torque in operation at higher speeds. The high speed range also provides full speed reverse operation which has the effect of extending the use of the vehicle.

To effect this capability a hydromechanical transmission is provided with a three element differential gearing at the output side of the transmission. On of the differential gears is driven by the input shaft through what is termed a low range clutch. Another of the differential gears is connected to the input shaft through a variable displacement hydrostatic transmission. The third gear in the differential drives the output shaft. A second clutch, or high range clutch, is provided for locking the differential elements together so that they rotate as a unit driven only through the hydrostatic path of the transmission. The high speed mode is thus provided without the requirement of heavy change speed gear boxes heretofore considered necessary.

The differential gearing ratio is selected such that the range of output speeds through the full displacement of the hydrostatic drive is greater in the high range than in the low range, or more specifically greater in the straight hydrostatic mode than in the split mode of the transmission.

In the low range mode, the high range clutch is disengaged, freeing the differential for variable speed ratio operation, and the low range clutch, interconnecting the differential to the input shaft, is engaged so that the transmission operates in a split power path. The input gearing ratio to the differential, through the straight mechanical path in combination with the differential gearing ratio, is such that the transmission output in the low range is zero when the displacement or output from the hydraulic transmission is at some intermediate positive value. That is, transmission neutral is achieved in the low range when the hydrostatic drive has a displacement between zero and maximum at one side of neutral. At zero transmission output in the low mode, the hydraulically driven gear of the transmission, i.e., the sun gear, rotates in a direction opposite the ring gear, i.e., the input shaft driven gear, at a rate sufficient to cause zero output from the carrier of the differential which is the output connected gearing.

In the high speed range, the low range clutch is disengaged and the high range clutch is engaged, locking the differential gear elements for rotation as a unit. Forward and reverse operation of the transmission occurs simply by varying the displacement of the hydraulic drive in one direction or other from neutral. In this mode, zero output from the transmission occurs when the hydraulic drive is in neutral. Thus, it is apparent that zero transmission output occurs at a different hydraulic transmission ratio in each mode, and according to the present invention a control is provided that inherently compensates for this lack of synchronism between modes and also provides for synchronous clutching.

According to the present invention, a single control handle is provided for controlling both the high and low range clutches as well as the displacement of the hydraulic drive of the transmission. The handle is pivotal about an axis, with movement about this axis controlling the displacement of the hydrostatic drive through a servo valve. According to one embodiment, a guide plate having a slot therein guides this pivotal movement of the control handle. The handle is also movable in a direction transverse to the pivotal axis to three positions, one which actuates one clutch, the second which actuates the other clutch, and the third which deactuates both. To hold the control handle in each of these three transverse positions, and thus control the mode of the transmission, pins are provided on the opposite sides of the control that ride selectively on opposites of the slot in the guide plate. One of the pins rides on top of the guide plate in the high range, while the other pin rides on the bottom of the guide plate during the low range with the pins flanking the guide plate in neutral. Shifting from one mode to the other is effected in neutral by providing a recess in the slot corresponding to the displacement of the hydraulic drive in each mode when the transmission output is zero.

Thus, the operator may operate the transmission in the low mode with the control handle pins riding under the plate with a full forward to reverse speed range. When mode shifting is required to the high speed range, the operator moves the control handle to neutral in the low speed range, shifts the control handle upwardly through the slot, and pivots the handle to a position corresponding to the displacement of the hydraulic drive in the high range mode where neutral transmission output is effected. The handle is then shifted upwardly engaging the high range clutch and disengaging the low range clutch so that both pins ride on top of the guide plate from full forward to full reverse in a high speed range mode.

DESCRIPTION OF THE DRAWINGS

FIG. 1 is a partly schematic illustration of a hydromechanical transmission according to the present invention;

FIG. 2 is an enlarged perspective view of one displacement and mode control for the transmission shown in FIG. 1;

FIG. 5 is another displacement and mode control for the hydromechanical transmission shown in FIG. 1.

DETAILED DESCRIPTION OF THE PREFERRED EMBODIMENTS

Figure 3:
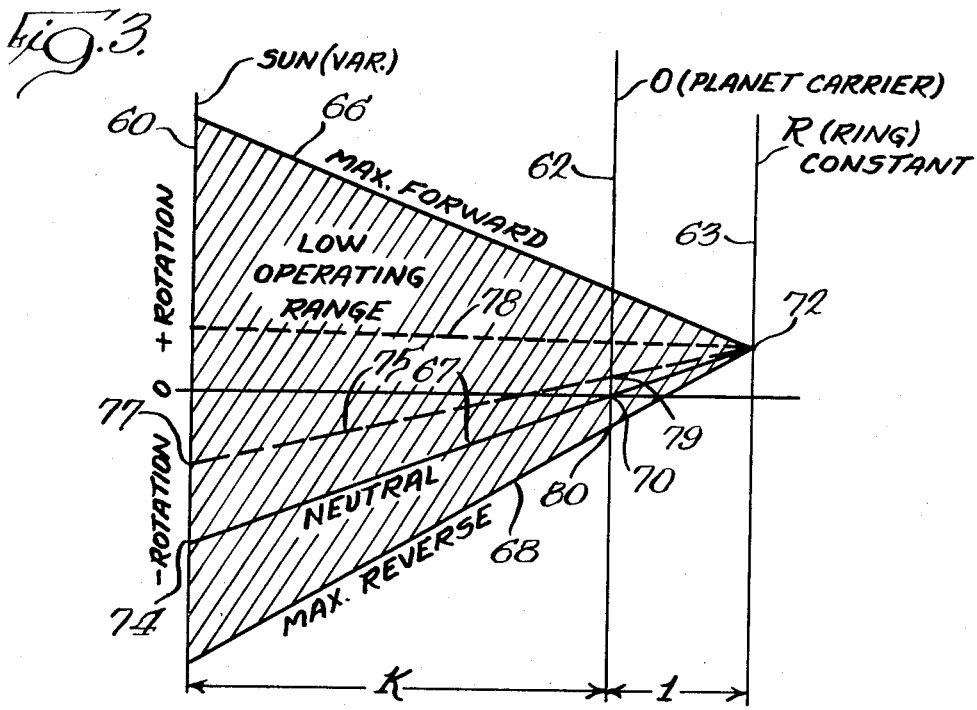
FIG. 3 is a graphic illustration of the speeds and direction of rotation of the differential elements of the transmission in FIG. 1 in the low range mode.

Referring to the drawings and particularly FIG. 1, a hydromechanical transmission 10 is illustrated particularly adapted for use with off-the-road vehicles, such as farm tractors. The transmission 10 has a low range split path mode to optimize efficiency during the predominant working use of the transmission and a high range straight hydrostatic mode to effect the high speed movement of the vehicle from one point to another.

The transmission 10 includes an input shaft 12 having a gear 13 connected thereto driving the gear 14 which in turn drives a hydrostatic transmission 16.

The output from the hydraulic transmission drives a sun gear 18 of an output differential 19 connected to drive output shaft 20.

The hydrostatic transmission 16 includes a variable displacement unit 20' driven by gear 14 through shaft 23. The variable displacement unit 20' is an axial piston hydraulic unit of conventional construction so that a detailed description need not be contained herein, except that it includes a rotary cylinder block 24 drivingly connected to shaft 23 and a pivotally mounted cam member 26 which reciprocates pistons 28 within the cylinder block 24. The displacement of hydraulic unit 20' is varied by a piston and cylinder device 30 connected to position and cam 26 through rod 32.

The variable displacement unit 20' delivers hydraulic fluid to a fixed displacement hydraulic unit 34 which is also of the axial piston design and includes a rotary cylinder block 36 and a fixed cam member 38 which reciprocates pistons 40 within the cylinder block 36. The cylinder block 36 is drivingly connected to shaft 42, connected at its other end to the sun gear 18.

In this manner the hydraulic transmission 16 delivers torque at varying speeds, depending upon the displacement of cam 26, to the sun gear 18 of the differential 19 and in this manner the transmission ratio is varied independent of input speed. The transmission can therefore be driven by a substantially constant speed prime mover.

The hydraulic transmission 16 thus provides the hydraulic or hydrostatic path for the transmission 10. The mechanical path for the transmission is provided from the input shaft 12, through a low speed range clutch 43 when engaged, an intermediate shaft 45 coaxial with input shaft 12, gear 47 fixed to intermediate shaft 45 and gear 50. Gear 50 interengages gear 47 and has formed integrally therewith an internal ring gear 52 comprising part of the differential 19. The gear ratio between gear 47 and gear 50 is approximately 5 to 1 so that the ring gear 52 rotates at a speed less than gear 14, which, in combination with the gear ratio of differential 19, yields a speed reduction in the low speed split mode.

The transmission shown in FIG. 1 operates as follows without the ancillary controls. When it is desired that the transmission operate in a low speed split mode, low range clutch 43 is engaged and high range clutch 58 is disengaged. Clutch 58 serves to lock the hydraulic transmission output shaft 42 to differential planet carrier 59 which carries pinions 60 so that the differential gears, when the clutch 58 is engaged, rotate together as a unit, and thus the differential gearing has a fixed 1 to 1 ratio. With the clutch 58 disengaged, however, in the low speed mode with the clutch 43 engaged, the differential elements are free to rotate at various speeds with respect to one another depending upon the gear ratio of the differential as well as the speed of shaft 42 which is the output from the hydraulic drive 16.

The high speed mode is effected by disengaging clutch 43 and engaging clutch 58. Thus, all of the power in the high speed mode is delivered through the hydrostatic drive 16 through differential 19, which is locked up for rotation as a unit, to the output shaft 20.

Figure 4:
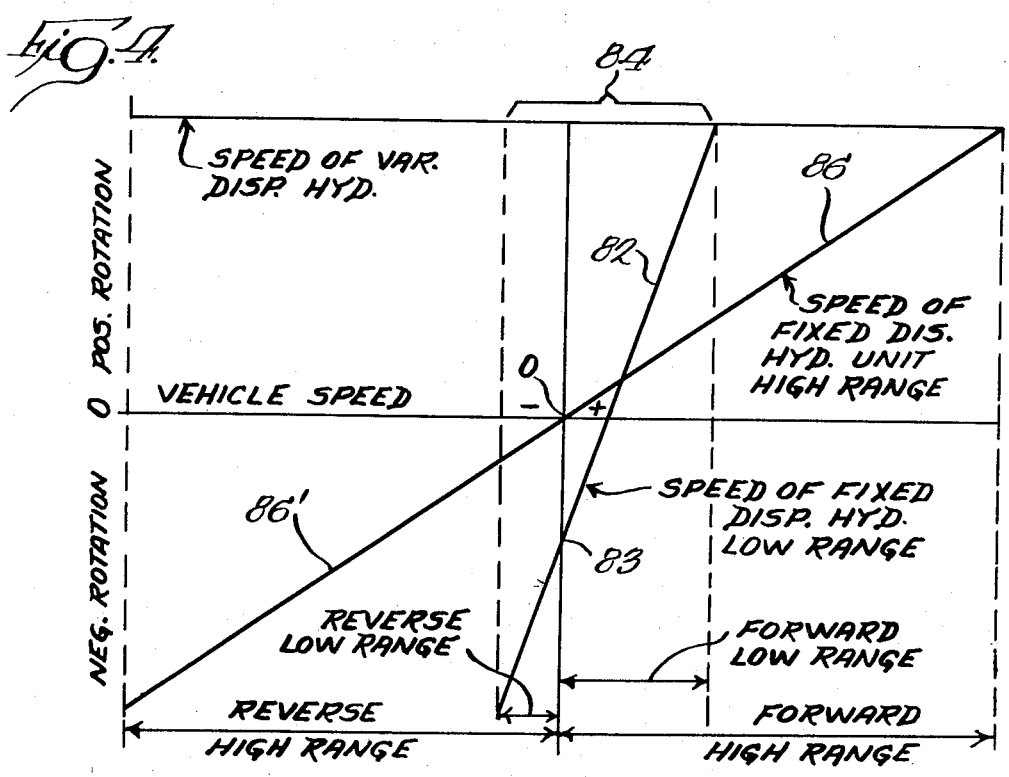
FIG. 4 is a graphic illustration of the speeds of the two hydraulic units in both low and high range modes as a function of vehicle speed.

In the low speed mode, with clutch 58 disengaged and clutch 43 engaged, the differential elements rotate in a direction and at speeds indicated in FIGS. 3 and 4. FIG. 3 is a graphic illustration of a three element differential with the speed of the sun gear 18, the output member 0 (carrier 59) and the ring gear R (52) being designated by lines 60, 62 and 63. The distance K is equal to the diameter of the ring gear 52 divided by the diameter of the sun gear 18. This is the effective ratio of the differential 19. The points of intersection of lines 66, 67 and 68 with lines 60, 62 and 63, respectively, represent the speeds of the three differential members in the low speed mode in maximum forward, neutral, and maximum reverse.

Thus, in neutral, i.e., transmission output zero, as indicated by point 70, ring gear R (52) is rotating at a positive rotational speed indicated by point 72, the planet carrier 59 is rotating at zero speed indicated by point 70, while sun gear 18 is rotating in a negative direction indicated by point 74. The speed of the ring gear remains substantially constant at point 72 since input shaft 12 operates at substantially the same speed throughout both modes of operation of the transmission. Thus, it is seen that in the low mode the displacement of cam 26 is selected at some negative displacement between zero and maximum to rotate sun gear 18 at speed 74 to subtract sufficient speed from the positive rotational effective of ring gear 52 to reduce the speed of the carrier 59 to zero as indicated at point 70. Therefore, in the low speed mode neutral the displacement of the hydraulic unit 20 is at a predetermined negative displacement to effect rotation of the sun gear 18 at speed 74.

To increase the speed of output shaft 20 in the low range mode, the displacement of hydraulic unit 20' is reduced towards neutral decreasing the speed of sun gear 18. The effect of this, with respect to the graph of FIG. 3, may be visualized by drawing a line such as indicated at 75 between point 72 and point 77 indicating the reduced speed of the sun gear. The result of this is an increase in forward speed of the output shaft 20 as indicated by point 79 on line 62.

It is readily apparent that the speed of any of the gears between maximum forward and maximum reverse may be determined from the graph in FIG. 3 by drawing a straight line from point 72 to the speed of the sun gear 18 on line 60.

To obtain reverse output shaft rotation in the low speed mode, the speed of the sun gear 18 is increased in a negative direction from point 74 which has the effect of subtracting more speed from the differential 19 causing reverse rotation of output shaft 20. At maximum reverse displacement of hydraulic unit 20' the output shaft 20 will have a reverse speed as indicated at 80 on line 62 in FIG. 3.

The speed and direction of rotation of the sun gear 18, and correspondingly the speed and direction of rotation of the fixed displacement unit 34 are indicated by curve 82 in FIG. 4 in the low range mode of the transmission. It is seen by the negative displacement of the point 83 that the sun gear 18 or the fixed displacement unit 34 is rotating in a reverse direction when the speed of the vehicle is zero. Note also that the speed range indicated at 84 for the low mode is significantly less than that indicated by the ordinate of curve 86 representing the high mode of the transmission.

The high speed range of the transmission is obtained with clutch 43 disengaged and clutch 58 engaged providing a straight hydrostatic power flow through the hydraulic transmission 16 with the differential 19 locked or at a fixed ratio. In this mode, transmission output neutral is obtained by moving the swashplate or cam 26 to zero displacement where no fluid is displaced with respect to the fixed unit 34 and shaft 42 is locked in position. With the shaft 42 locked in position and clutch 43 disengaged, there is no input to the differential and hence no output as represented by point O on curve 86 in FIG. 4. Thus, the clutch 58 may be synchronously engaged with its clutch elements stationary. To place the transmission in a forward direction of operation in the high mode, the cam 26 is rotated in a direction producing a positive rotation of the sun gear 18 and hence a positive or forward rotation of the output shaft at the same speed. Reverse rotation of the output shaft 20 is obtained by moving the cam 26 in a reverse direction from neutral, reversing the direction of hydraulic output shaft 42 and hence the differential 19 along with output shaft 20 as viewed by curve portion 86' in FIG. 4.

As viewed in FIG. 2, a control 90 is provided for controlling the high or low mode of the transmission as well as controlling the speed ratio of the transmission. Toward this end, a displacement control valve 91 is provided having a displacement control valve member 92 slidable therein with lands 93 and 94 separated by a reduced stem portion 95. Hydraulic fluid is supplied through port 97 to valve bore 100 selectively to either port 101 or 102 depending upon the displacement of the valve lands 93 and 94. With valve member 92 shifted to the right pressurizing port 102, the displacement control cylinder 30 will be pressurized on the side thereof to move the cam 26 in a direction to cause positive rotation of shaft 42 as viewed in FIGS. 3 and 4. Similarly, pressurization of port 101 by shifting valve member 92 to the left causes movement of the cam member 26 toward a direction producing negative rotation of the shaft 42 and sun gear 18.

The valve member 92 is controlled by a first link 104 pivotally connected to the valve member and to a second link 106 positioned by an input linkage assembly 108 intermediate of the link 106. The opposite end 110 of the link is positioned in feedback fashion by the cam 26 so that the valve 92 is a servo valve, the position of the cam member 26 being determined by the position of input linkage 108. Linkage 108 is positioned by a link 112 fixed to pin 114 pivotable in bearing 115 about a stationary axis of rotation 116 and connected to an L-shaped link 120.

The L-shaped link 120 slidably receives a handle 122 so that upon pivotal movement of the handle 122 about axis 116 the valve member 92 may be positioned to effect either forward or reverse displacement in the displacement control cylinder 30 as desired.

The handle 122 also controls the mode of the transmission. Toward this end, valve housing 128 is provided as shown in FIG. 2 having a valve bore 129 with a valve member 130 slidable therein. Valve member 130 has valve lands 131 and 132 formed integrally therewith.

In the high range mode illustrated in FIG. 2, lands 131 and 132 interconnect a supply passage 133 with a high range passage 134 actuating the clutch 58, and deactuating clutch 43 which is actuated by pressurization of port 135. Upon downward shifting of the valve 130, valve lands 131 and 132 connect low range port 135 to supply port 133 and connect high range port 134 to drain, thereby actuating low range clutch 43 and deactuating high range clutch 58. In an intermediate position of valve member 130, pressure port 133 is blocked from both clutch ports 134 and 135, and the latter are connected to drain.

For the purpose of retaining valve member 130 in neutral, high mode, or low mode, a detent assembly 140 is provided in link 120. The detent assembly 140 includes a spring biased ball 142 in link 120 selectively engageable with recess 144, 145 and 146 on handle rod 160 to locate the handle assembly 120 in, respectively, a high range mode, neutral, or a low range mode. The detent assembly 140 serves to hold the valve member 130 in each of its three positions.

Valve member 130 is interconnected to the handle assembly 122 by a link 150 pivotally connected about axis 152 to valve member 130 and pivotally connected to the handle 122 about axis 153. When the handle 122 is in its lower low mode position, axis 153 is coincident with axis 116 of the displacement control and conversely when the handle 122 is in the high mode illustrated, axis 152 is coincident with axis 116 to permit the free pivotal movement of handle 122 without any sliding movement with respect to link 120.

The handle assembly 122 includes a rod 160 having an enlarged portion 161 carrying pivotally mounted bars 163 and 164 biased apart by a spring member 168. The bars 163 and 164 are slidable in an elongated slot 167 in guide plate 170.

The spring 168 urges bars 163 and 164 outwardly against the edges of slot 167 to retain the handle 122 in any desired position and thus maintain the transmission ratio selected by the operator.

The slot 167 has a first recess 172 which receives a reduced portion 173 on bar 164 when adjacent thereto to automatically lock and hold the control handle 122 in neutral, low mode, since spring 168 urges bar members 163 and 164 apart. It is then required that the operator squeeze the handle bars 163 and 164 together to vary transmission ratio either in a forward or reverse direction from neutral in the low mode. Similarly, a second recess 175 is provided for receiving a reduced portion 176 in handle bar 163 to receive and hold the control handle in neutral in the high mode. The recessed 172 and 175 are positioned such that the effected displacement of the variable displacement unit 20' will cause a zero transmission output when the handle assembly is adjacent to the recesses.

A first upper pin 181 projects from bar 164 for the purpose of riding on the lower surface of the plate 170 to vary the speed ratio of the transmission in the low range. Similarly, a pin 185, somewhat below the pin 181, extends outwardly from handle bar 163 and rides on the upper surface of plate 170 in the high range mode of the transmission to vary the transmission ratio. Recesses 188 and 189, extending from recesses 172 and 175, respectively, permit the pins 181 and 185 to pass through the plate 170 when the handle portions 163 and 164 are moved toward each other.

In operation of the control shown in FIG. 2, assuming initially that the transmission is in the state set by the location of handle 122, as shown, pin 185 will ride on the top of the plate 170 so that the valve member 130 is in its upper position pressurizing port 134 and placing the transmission in its straight hydrostatic high range with clutch 58 engaged and clutch 43 disengaged. The speed ratio of the transmission may thus be varied by pivoting handle 122 about axis 152, as desired, to the right of recess 175, driving the vehicle in a forward high speed range. When it is desired to place the transmission in neutral in the high speed range, the handle assembly 122 is moved adjacent recess 175 where handle bar 163 automatically moves into recess 175 under the influence of spring 168 locking the handle in its neutral position arresting movement of the vehicle in the high speed range. To place the transmission in the reverse mode of the high speed range, handle members 163 and 164 are squeezed together, and the handle 122 pivoted further counterclockwise about pivot 152 reversing the displacement of cam 26 and thereby reversing the output of the transmission.

To effect a change in mode, the transmission is placed in neutral high mode, arresting the vehicle with the bar 163 in recess 175. Thereafter, the operator shifts the handle assembly 122 downwardly passing pin 185 through recess 189 and at the same time rotating the control handle 122 in the slot 167 with pin 181 above the plate and pin 185 below the plate. This positions the ports 134 and 135 so that they both communicate with drain, disengaging both clutches 43 and 58. At this time, ball detent 142 is engaged in neutral recess 145.

When the handle 122 is adjacent slot 172, the ratio of transmission 16 is such that gear 18 is rotating at a speed sufficient to produce a zero output when gear 47 is rotating synchronously with the input shaft, but at this time clutch 43 is disengaged. Clutch 43 is engaged when the operator further depresses handle 122 passing pin 181 through the recess 188 which moves the ball detent assembly 140 into the recess 146, thereby placing valve 130 in the low range mode. This engages clutch 43 synchronously and disengages clutch 58.

Handle assembly 122 may then be pivoted about pivot 153 in a clockwise direction as shown in FIG. 2 effecting transmission output in a forward direction. Movement of the handle back to recess 172 will cause lever 164 to lock in recess 172 under the influence of spring 168. The transmission may then be placed in reverse low speed mode by the operator squeezing the handle members 163 and 164 and rotating the handle counterclockwise from recess 172.

As shown on plate 170 in FIG. 2, it is contemplated that a preferred transmission configuration would produce vehicle movement in the high range up to 18 m.p.h. in forward and reverse, and in the low range up to 7.2 m.p.h. forwardly and 2.3 m.p.h. reversely, at rated engine speed. As seen in FIG. 4, where the lines 82 and 86' cross, there is a place in the angular movement of the control handle where the vehicle output speed is the same in both ranges. At such handle position, with the vehicle in motion in either mode, the clutch elements in the open clutch 47 or 58 rotate synchronously, allowing synchronous clutching. Such condition is demonstrated in FIG. 3 by horizontal line 78. This condition occurs at about 3.2 m.p.m., at rated engine speed, and if desired, provision may be made in the plate 170 to shift directly from one range to the other at the place where vehicle speed will not change. Specifically, recesses 190 and 191 at opposite sides of slot 167 are provided to permit both pins 181 and 185 to pass through plate 170 at the same displacement position of the handle. It should be understood that shift should be directly from one mode to the other without stopping in neutral, because at no output speed, both clutches would be nonsynchronous.

An alternative speed ratio and mode control 200 is shown in FIG. 5 and is generally similar to the one shown in FIG. 2 except that no automatic neutral locking is provided. A displacement control valve 201 is included having a valve bore 202 slidably receiving a valve member 204 having lands 205 and 206 thereon controlling supply fluid from port 210 to either of ports 211 or 212. The pressurization of port 211 increases transmission output speed in both modes while the pressurization of port 212 decreases transmission output speed in both modes, in the forward direction. Valve member 204 is positioned by a lever 213 pivotally connected at 214 to a rod 215 extending from the valve member. Lever 213 is adapted to be connected at 216 to receive a feedback signal from the displacement control cam, and is connected at the opposite end to a handle mechanism including a lever formed by a pivoted end bar 217, a central bar 219 and an opposite bar 220. Rods 221 and 222 are fixed to bars 217 and 220, but slidably receive the bar 219. Bar 219 is fixed as at 223 to rod 224, in turn fixed to a mode control valve member 225.

The other end of rod 224 is rotatable in a bearing member 226 and the bearing is stationary so that the three-bar linkage pivots about the axis of bearing 226 which is coincident with the axis of the valve member 225.

Valve member 225, slidable in a valve housing 227, has spaced lands 228 and 229 separated by a reduced stem portion 230.

In the center position of the valve member shown, low range clutch port 231 and high range clutch port 232 are both connected to drain deactuating both clutches when the transmission is in neutral. The leftward displacement of valve member 225 pressurizes port 231 from supply port 235, and continues the depressurization of high range port 232. Rightward movement of valve 225 pressurizes the high range clutch port 232 and maintains the depressurization of low range port 231.

Central sliding link 219 is integrally formed with a handle 237 guided by an arcuate guide plate 240.

The guide plate 240 in the FIG. 5 embodiment has elongated parallel guide slots 241 and 242, slot 241 being positioned with respect to the valve member 225 so that the low range clutch is pressurized when the handle 237 slides in slot 241. Similarly, the high range slot 242 is positioned so that the valve member 225 pressurizes high range port 232 when the handle slides in this slot.

Interconnecting the slots 241 and 242 to permit shifting of the handle 237 between the low and the high ranges is a recess 243 having a first portion 244 communicating with slot 241 at a point where the speed ratio in the low mode is such as to permit a zero output speed, more commonly referred to as neutral low range. The second slot portion 246 is parallel to the slots 241 and 242 and is positioned so that when the handle 247 rides in the slot the valve member is in a neutral position depressurizing both of the clutch ports and deactuating both clutches. The recess 243 has a third portion 250 transverse to the slots connecting slot 246 with slot 242 at a point where the transmission ratio in the high range mode produces a zero output speed for the transmission, more commonly referred to as neutral high range.

In operation of the FIG. 5 control, assume that the handle 237 is in slot 241 at the zero or neutral position. In this position the sliding link 219 has shifted rod 224 to the left along with clutch valve 225, pressurizing port 231, depressurizing port 232 thereby actuating the low range clutch 43 and deactuating the high range clutch 58. At the same time, the valve member 204 is shifted to the right porting fluid to control cylinder 30 to place it in an intermediate negative position which will produce rotation of sun gear 18 at a speed indicated at 74 in FIG. 3 to effect a zero output shaft speed from shaft 20. From this point the operator may rotate the handle 237 clockwise to reduce the displacement of hydraulic unit 20' thereby increasing the transmission speed to, for example, 7.2 m.p.h. as indicated in FIG. 5, or reverse transmission output by rotating handle 237 in slot 241 in a counterclockwise direction increasing the displacement of hydraulic unit 20' in an opposite direction and reversing the direction of rotation of output shaft 20.

To shift from the high mode, the operator brings the handle 237 in slot 241 back to neutral adjacent recess 244 and shifts the handle into recess 244 and then into recess 246. This places the valve member 225 in neutral deactivating the clutches 43 and 58. The handle is then shifted rightwardly in slot 250 which shifts the valve member 224 to the right pressurizing the high range clutch port 232 and depressurizing the low range clutch port 231, which actuates clutch 58 and deactuates clutch 43.

When the handle is in slot 242, it is positioned to achieve neutral output from the transmission which corresponds to a zero displacement of hydraulic unit 20' in the high range mode. The transmission may be operated in forward or reverse in the high range mode by rotating the handle 237 in either direction in slot 242.

Similar to the FIG. 2 control, the FIG. 5 control 200 controls both the speed range of the transmission as well as the speed ratio. It automatically compensates for the difference in the displacement of hydraulic unit 20' at zero or neutral in both modes.

We claim:

1. A hydromechanical transmission, comprising: an input shaft, an output shaft, two power paths between the input shaft and the output shaft including a mechanical path and a hydraulic path, said hydraulic path including a variable speed hydraulic transmission, a differential unit for combining power from said mechanical path and said hydraulic path including a first gear, clutch means selectively drivingly connecting said first gear to the input shaft and defining the mechanical path, a second gear drivingly connected to the hydraulic transmission, a third gear drivingly connected to said output shaft, means for selectively fixing the speed ratio between said first, second and third gears, control means for providing a low speed range and a high speed range including means for actuating said clutch means and deactuating said speed ratio fixing means to transmit power hydromechanically through both paths from the input shaft to the output shaft in the low speed range, and means for deactuating said clutch and actuating said speed ratio fixing means to transmit all power hydraulically from the input shaft to the output shaft in the high speed range, said control means including means for varying the hydraulic transmission ratio to reduce the speed of the output shaft to zero in both the high and low speed ranges.

2. A hydromechanical transmission as defined in claim 1, wherein said gear ratio fixing means includes a clutch for selectively locking the differential gears for rotation as a unit.

3. A hydromechanical transmission as defined in claim 1, wherein said differential gearing is sized so that the speed range in high speed range is greater than the speed range in the low speed range for a corresponding change in the variable speed hydraulic transmission.

4. A hydromechanical transmission: comprising, an input shaft, an output shaft, two power paths between the input shaft and the output shaft including a mechanical path and a hydraulic path, said hydraulic path including a variable speed hydraulic transmission, a differential unit for combining power from said mechanical path and said hydraulic path including a first gear, clutch means selectively drivingly connecting said first gear to the input shaft and defining the mechanical path, a second gear drivingly connected to the hydraulic transmission, a third gear drivingly connected to said output shaft, means for selectively fixing the speed ratio between said first, second and third gears, and control means to vary the ratio of the hydraulic transmission for providing a reversible output low speed range and a reversible output high speed range, said means for providing a reversible output low speed range and a reversible output high speed range including means to engage said clutch and disengage said gear ratio fixing means to transmit power hydromechanically through both paths from the input shaft to the output shaft in the low speed range, means for disengaging said clutch and engaging said speed ratio fixing means to transmit all power hydraulically from the input shaft to the output shaft in the high speed range, said control means including control means in each of said low speed range and said high speed range for effecting reversal of said output shaft.

5. A hydromechanical transmission as defined in claim 4, wherein said means for effecting reversal of the output shaft in the low speed range includes means for varying the hydraulic transmission speed ratio to subtract sufficient speed from the differential to reverse the direction of rotation of the output shaft.

6. A hydromechanical transmission as defined in claim 5, wherein said means for effecting reversal of the output shaft in the high speed range includes means to vary the ratio of the hydraulic transmission to reverse the direction of rotation of the second gear in the differential.

7. A hydromechanical transmission, comprising: an input shaft, an output shaft, a differential including a first gear, a second and a third gear, first clutch means selectively connecting said first gear to said input shaft, a hydraulic transmission having an input driven by said input shaft and an output drivingly connected to said second gear, said third gear being drivingly connected to said output shaft, second clutch means selectively locking said differential gears together for rotation as a unit, means for varying the displacement of the hydraulic transmission from maximum in one direction to neutral, and maximum in the other direction, control means providing a split drive low speed range including means locating the displacement varying means between neutral and maximum on one side of neutral to subtract sufficient speed from the differential to reduce the output shaft to zero, said control means in the low speed range engaging said first clutch and disengaging said second clutch, said control means providing a straight hydraulic high speed range including means for locating said displacement varying means in neutral to effect zero output from said output shaft, said control means in the high speed range disengaging said first clutch means and engaging said second clutch means.

8. A hydromechanical transmission as defined in claim 7, wherein said control means for said high speed range and said low speed range includes a handle pivotally mounted, means connecting said handle to control the displacement varying means during pivotal movement of said handle, means for locating said handle in a first pivotal position defining the displacement of the displacement varying means at zero output speed in the low speed range, means for locating said handle in a second pivotal position defining the displacement of the displacement varying means at zero output speed in the high speed range of the transmission.

9. A hydromechanical transmission as defined in claim 8, wherein said handle is movable in a direction transverse to said pivotal movement from a first transverse position to a second transverse position for controlling said clutches, means responsive to the positioning of said handle in the first transverse position for actuating said first clutch and deactuating said second clutch, means responsive to the positioning of said handle in the second transverse position for deactuating said first clutch and actuating said second clutch.

10. A hydromechanical transmission, comprising: an input shaft, an output shaft, differential gearing including a first gear, a clutch selectively connecting said first gear to said input shaft, a second gear, a hydraulic transmission connecting said second gear to one of said shafts, means for varying the displacement of said hydraulic transmission, a third gear drivingly connected to said output shaft, means selectively fixing the speed ratio of the gears, means for effecting a first low speed range including means for actuating said clutch and deactuating said speed ratio fixing means to transmit power hydromechanically through both paths from the input shaft to the output shaft, means for effecting a second high speed range including means for deactuating said clutch and actuating said speed ratio fixing means to transmit all power hydraulically from the input shaft to the output shaft, said differential gearing being arranged so that zero output speed in the first range is effected at a different hydraulic transmission displacement than in the second speed range, and control means for said displacement varying means having a first position defining zero output speed in said first range and a second position defining zero output in the second range.

11. A hydromechanical transmission, comprising: an input shaft, an output shaft, differential gearing including a first gear, a clutch selectively connecting said first gear to said input shaft, a second gear, a hydraulic transmission connecting said second gear to one of said shafts, means for varying the displacement of said hydraulic transmission, a third gear drivingly connected to said output shaft, means selectively fixing the speed ratio of the gears, means for effecting a first speed range including means for actuating said clutch and deactuating said speed ratio fixing means, means for effecting a second speed range including means for deactuating said clutch and actuating said speed ratio fixing means, said differential gearing being arranged so that zero output speed in the first range is effected at a different hydraulic transmission displacement than in the second speed range, and control means for said displacement varying means having a first position defining zero output speed in said first range and a second position defining zero output in the second range, said control means including a handle pivotal about an axis, means responsive to movement of said handle about said axis for controlling said displacement varying means, means for selectively holding said handle in said first and second positions, said handle being movable in a direction transverse to movement about said axis from a third position to a fourth position, means responsive to movement of said handle to said third position for actuating said clutch and deactuating said means for fixing the speed ratio of the differential, and means responsive to movement of the handle to the fourth position for deactuating said clutch and actuating said means for fixing the speed ratio of the differential.

12. A hydromechanical transmission as defined in claim 11, including means mounting the handle for movement parallel to the pivot axis, a guide plate for said handle, said guide plate having spaced parallel slots each adapted to control movement of the handle about said axis in one of the first or second ranges, said first position of said handle being located in one of said slots, said second position of said handle being located in the other of said slots, a third slot interconnected with said first and second slots at said first and second positions to permit shifting of said handle from one slot to the other, said third slot defining the third and fourth positions of said handle so that control of said clutch and gear ratio fixing means is achieved as the handle is moved through the third slot.

13. A hydromechanical transmission as defined in claim 12, including a guide plate for guiding movement of the handle about said axis and having a slot therein.

14. A hydromechanical transmission as defined in claim 13, including means mounting said handle for motion transverse to the pivot axis, a first pin on said handle defining said third position thereof when engaging one side of said plate, and a second pin on said handle defining said fourth position of the handle when engaging the opposite side of said plate.

15. A hydromechanical transmission as defined in claim 14, wherein said slot has a first recess therein permitting movement of the first pin therethrough and defining the first position of the handle with both pins on one side of the plate, said slot having a second recess therein permitting movement of the second pin therethrough and defining the second position of the handle with both pins on the other side of the plate, whereby the handle may be moved from zero output in the first mode to zero output in the second mode by moving the first pin through the first recess, sliding the handle toward the second recess with the pins straddling the plate, and moving the second pin through the second recess.

16. A hydromechanical transmission as defined in claim 14, wherein said plate has recesses at opposite sides of said slot permitting movement of both sides through the plate at a pivotal position of the handle where the output speed of the transmission is the same in both ranges.

17. A hydromechanical transmission as defined in claim 14, including a first hand grip portion pivotal on said handle and carrying the first pin, a second hand grip portion pivotal on the handle and carrying the second pin, means mounting the hand grip portion for movement between positions where the pins will not pass through the plate recesses, and portions where the pins will pass through the plate recesses.

18. A hydromechanical transmission as defined in claim 14, wherein said slot has a first recess defining zero output shaft speed in one speed range and a second recess defining zero output shaft speed in the other speed range of the transmission, said handle bars being movable into said recesses when adjacent thereto to hold the handle in the neutral position in both speed ranges.

19. A hydromechanical transmission as defined in claim 14, said handle being movable to a fifth position where the pins straddle said plate, means responsive to movement of the handle to the fifth position for deactuating both said clutch and said means for fixing the speed ratio of said differential.

20. A hydromechanical transmission as defined in claim 19, wherein each of said handle bars has a pin extending therefrom, the pin on one of said bars being slidable on top of the plate holding the handle in a position actuating one of said clutches, the pin on the other of said bars being slidable on the bottom of said plate holding the handle in a position actuating the other of said clutches, said recesses being sufficiently small so that the pins cannot pass therethrough without compressing the handle bars to prevent inadvertent shifting of the clutches.

21. A hydromechanical transmission: comprising, an input shaft, an output shaft, two power paths between the input shaft and the output shaft including a mechanical path and a hydraulic path, said hydraulic path including a variable speed hydraulic transmission, a differential unit for combining power from said mechanical path and said hydraulic path including a first gear, first clutch means selectively drivingly connecting said first gear to the input shaft and defining the mechanical path, a second gear drivingly connected to the hydraulic transmission, a third gear drivingly connected to said output shaft, second clutch means for selectively fixing the speed ratio between said first, second and third gears, control means for providing a reversible output low speed range and a reversible output high speed range, means for synchronously engaging said first clutch means and disengaging the second clutch means to establish said low speed range to transmit power hydromechanically through both paths from the input shaft to the output shaft, and means for synchronously engaging said second clutch means and disengaging the first clutch means to establish said high speed range to transmit all power hydraulically from the input shaft to the output shaft.

22. A hydromechanical transmission, comprising: an input shaft, an output shaft, differential gearing including a first gear, a first clutch including elements engageable for selectively connecting said first gear to said input shaft, a second gear, a hydraulic transmission connecting said second gear to one of said shafts, means for varying the displacement of said hydraulic transmission, a third gear drivingly connected to said output shaft, a second clutch including elements engageable for selectively fixing the speed ratio of the gears, means for effecting a first speed range including means for actuating said first clutch and deactuating said second clutch, means for effecting a second speed range including means for deactuating said first clutch and actuating said second clutch, said differential gearing being arranged so that zero output speed in the first range is effected at a different hydraulic transmission displacement than in the second speed range, and control means for disengaging both clutches to establish transmission neutral, and for engaging the elements of either clutch while synchronous to shift from neutral to either range at zero output, and for engaging the elements of either clutch while rotating synchronously to shift from one range to the other at a predetermined output speed.

23. A hydromechanical transmission, comprising: an input shaft, an output shaft, differential gearing including a first gear, a first clutch for selectively connecting said first gear to said input shaft, a second gear, a hydraulic transmission connecting said second gear to one of said shafts, means for varying the displacement of said hydraulic transmission, a third gear drivingly connected to said output shaft, a second clutch for selectively fixing the speed ratio of the gears, means for effecting a first speed range including means for actuating said first clutch and deactuating said second clutch, means for effecting a second speed range including means for deactuating said first clutch and actuating said second clutch, said differential gearing being arranged so that zero output speed in the first range is effected at a different hydraulic transmission displacement than in the second speed range, control means for said displacement varying means having a first position defining zero output speed in said first range and a second position defining zero output speed in the second range, and control means for disengaging both clutches to establish transmission neutral and for engaging either clutch to shift synchronously from neutral to either range.

24. A transmission as defined in claim 23, including means for engaging either clutch to shift synchronously from either range to the other at a predetermined output speed.

25. A hydromechanical transmission, comprising: an input shaft member, an output shaft, a hydraulic drive driven by said input shaft, a shaft member driven by said hydraulic drive, means for varying the drive ratio of the hydraulic drive, a differential mechanism for combining torques of the input shaft and hydraulic drive including a first gear means drivingly connected to one of said shaft members, a second gear means drivingly connected to said output shaft, and third gear means for controlling the relative rotation of said first gear means and said second gear means, means providing plural speed ranges for said transmission including a first clutch selectively connecting said other shaft member to said third gear means, and a second clutch selectively connecting said gear means to provide a second speed range, control means for said ratio varying means and said first and second clutches including a plate having an elongated slot therein, a pivotally mounted control handle slidable in said slot, said handle being connected so that pivotal movement thereof controls the drive ratio varying means and so that transverse movement thereof controls the first and second clutches, said handle including a pair of parallel handle bars, and resilient means urging said bars apart and into contact with said slot to frictionally hold said handle in the desired position.

* * * * *